United States Patent [19]
Ruelle et al.
[11] Patent Number: 4,971,848
[45] Date of Patent: Nov. 20, 1990

[54] HEATABLE PANELS

[75] Inventors: Jacques Ruelle, Hyon, Belgium; Henry Caty, Vieux Reng, France

[73] Assignee: Boussois S.A., Levallois-Perret, France

[21] Appl. No.: 338,133

[22] Filed: Jan. 8, 1982

[30] Foreign Application Priority Data

Jan. 14, 1981 [GB] United Kingdom ................ 8101029

[51] Int. Cl.[5] .......................... B32B 3/10; B60L 1/02; H05B 3/06

[52] U.S. Cl. ...................................... 428/38; 219/203; 219/522; 361/212; 361/217; 428/204; 428/209; 428/256; 428/922

[58] Field of Search ................ 219/203, 522; 361/212, 361/217; 428/38, 204, 209, 256, 922

[56] References Cited

FOREIGN PATENT DOCUMENTS

| | | | |
|---|---|---|---|
| 1446248 | 6/1966 | France | 219/522 |
| 1209777 | 10/1970 | United Kingdom . | |
| 1498074 | 1/1978 | United Kingdom | 219/203 |

*Primary Examiner*—Bruce H. Hess
*Attorney, Agent, or Firm*—Spencer & Frank

[57] ABSTRACT

An electrically heatable transparent panel (1) comprises spaced electrically conductive bus strips (2, 3) interconnected by electrically conductive heating means (4) deposited on a substrate (5) of glazing material.

To reduce the visual obtrusiveness of the heating means (4) as compared with linear heating elements as conventionally used in heatable rear windows or motor vehicles, and for other purposes, the heating means comprises electrically conductive enamel deposited meshwise on the substrate, the interstices of the mesh having a maximum dimension of 10 mm or less, and substantially no individual line of mesh has a width greater than 0.5 mm.

17 Claims, 2 Drawing Sheets

FIG. 3
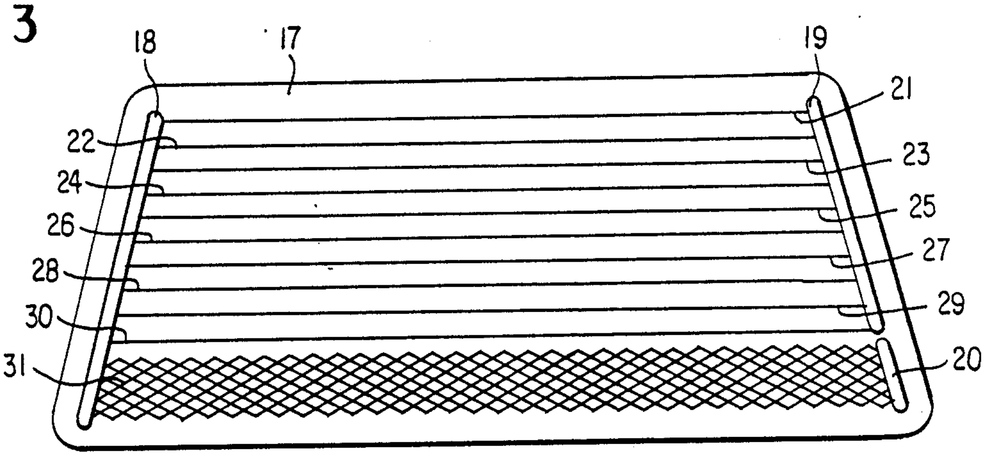
FIG. 4
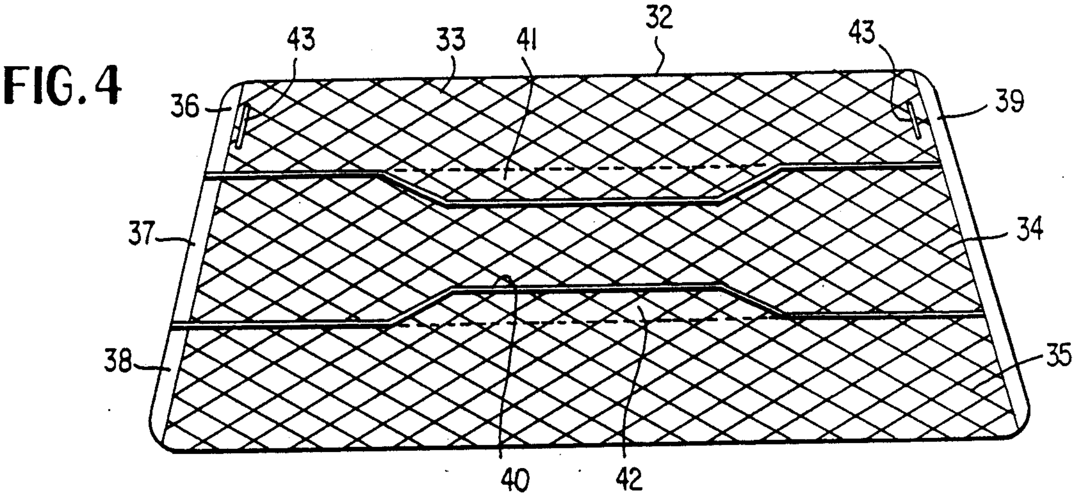
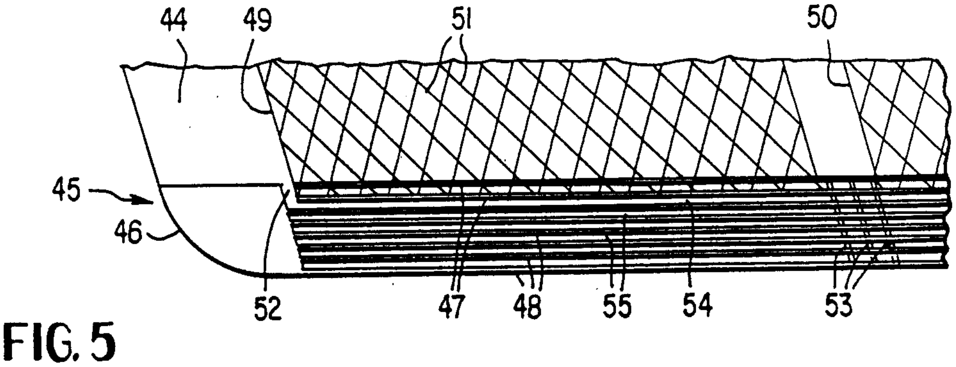
FIG. 5

HEATABLE PANELS

BACKGROUND OF THE INVENTION

The present invention relates to electrically heatable transparent panels comprising spaced electrically conductive bus strips interconnected by electrically conductive heating means deposited on a substrate of glazing material. The expression "glazing material" is used herein to denote transparent material for use in closing window openings and thus includes glass, victrocrystalline materials and plastics materials when transparent.

Such heating panels are known to be particularly useful when embodied as vehicle windows, especially rear viewing windows of motor vehicles, and for other purposes.

It will be apparent from a walk through any car park that the most common form of vehicle rear window heater comprises bus strips extending up the side margins of the window which are interconnected by a plurality of linear heating elements extending generally horizontally across the window. Depending on the height of the rear window there will often be about thirteen or fourteen of these elements spaced apart by some 2.5 to 3.5 cm and each element will be about 1 mm in width.

It is known in the case of a 'wrap-around' rear window to improve the appearance of the side portions by reducing the width of the heating elements there, as compared with the width of the heating elements on the central portion, and to compensate for the resultant increase in resistance by providing conductive shunts.

These heating elements are conventionally formed by serigraphic deposition of a conductive enamel which is heat-bonded to the window. The bus strips are usually formed in the same way and indeed at the same time. It is a usual requirement that the heat output from the window heater should be 140–160 watts, and this implies a total conductivity of the heater of about 1 reciprocal ohm in a 12 volt system. Thus the average resistance of the individual heating elements should be about N ohms where N is the number of heating elements.

In practice, this resistance requirement is in conflict with a maximum permissible line-width (for visibility reasons) so that to achieve the necessary conductivity the enamel which is used is overwhelmingly, if not universally, a silver containing enamel.

Silver is very expensive.

One way of economising on the use of silver which is very often adopted is to coat the window heater electrolytically with a metal such as copper. It would clearly be advantageous to dispense with this step if possible unless it is required for some other purpose.

A further disadvantage of this most common form of heated rear window lies in the width of the heater elements. At a width of 1 mm, they are obtrusive when viewed through a rear view mirror by a driver of the vehicle.

Yet a further disadvantage lies in the relative spacing of these heater elements. Such heater elements are apt to become abraded and damaged or even broken prematurely, for example by over-enthusiastic cleaning of the window and when this happens, not only is the heat output from the heater much reduced, but the reduction is within a strip across the whole breadth of the window which often cannot be cleared of condensation for some considerable time.

SUMMARY OF THE INVENTION

It is an object of the present invention to provide a new and alternative configuration for heating means for an electrically heatable transparent panel in which one or more of the disadvantages referred to above is reduced. Particular advantages attendant on the adoption of various specific essential or optional features of the invention will be adverted to later in this specification.

According to the present invention, there is provided an electrically heatable transparent panel comprising spaced electrically conductive bus strips interconnected by electrically conductive heating means deposited on a substrate of glazing material, characterised in that said heating means comprises electrically conductive enamel deposited meshwise on said substrate, the interstices of such conductive mesh having a maximum dimension of 10 mm or less, substantially no individual line of such conductive mesh being greater than 0.5 mm in width.

By constructing a glazing panel in accordance with the invention, the disruption of the heat output distribution from the panel consequent on a break in any single conductive mesh line is localised since the current will be able to flow around the break through other mesh lines. The restriction on the maximum width of the individual mesh lines is of especial importance for the visual appearance of a said panel when it is constituted as a vehicle rear window. The length of the optical pathway between the driver's eye and the rear window via the rear view mirror will of course depend on the type and size of the vehicle, but for almost all private cars it will lie in the range 2 to 3 meters. A figure which is often quoted for the resolving power of the average human eye is 1 minute of arc or $3\times10^{-4}$ radian, that is, 0.6 mm at 2 meters. Accordingly, by adopting this feature of the invention in an embodiment for use as a rear window of a motor vehicle, the width of the mesh lines will in general be less than can be resolved by the eye of a driver looking through such a rear window via a rear view mirror so that the mesh lines will not be visually obtrusive. The individual lines of the conductive mesh are most preferably below 0.3 mm in width.

It will also be appreciated that vibration of a motor vehicle to which a said panel is fitted will further reduce the visual impact of a meshwise deposited heater.

The minimum width of a said line will be a function of the granulometry of the conductive material applied and of the process by which it is applied. The conductive enamel may be of organic or vitreous type containing finely divided metal particles.

To allow good visibility through the panel, substantially all the mesh interstices preferably have a smallest dimension of at least 1.5 mm. It will of course be appreciated that some interstices at the edge of the heating element may have a smaller dimension than that by virtue of the fact that part of a notional interstitial space area is occupied by a portion of a bus strip.

In the most preferred embodiments of the invention, substantially all said interstices have dimensions of between 2 mm and 6 mm. It has been found that this feature provides the best compromise between visibility through the panel and the localisation of disruption of the heat output distribution of the heater should a mesh line become broken. Furthermore, when this feature is adopted together with the most preferred mesh line width, the heater gives the appearance of a veil so as to present, in the case of a panel used as a vehicle rear window, a substantially uniform appearance to a driver of the vehicle.

It will of course be appreciated that deposition of the mesh-like heating means will reduce the visible light-transmissivity of the panel. Preferably said conductive mesh is so deposited as to cover no more than 20% of the area of the panel enclosed by the boundary of such mesh, so as to allow an adequate degree of visibility therethrough.

In preferred embodiments of the invention, the conductive mesh is deposited in a rectangular or square pattern, in a diamond or lozenge mesh pattern, or in a hexagonal mesh pattern.

The panel may include a single mesh-wise deposited heating element covering the whole area of the panel which it is desired to heat, or mesh-wise deposited conductive material may be confined to a particular region of the panel which it is desired to heat differently from other regions of the panel. For example in the case of motor vehicle rear windows, manufacturers often like to provide a rear window wiper. In cold weather, when the rear window ices up, it is often found that the wiper blade freezes to the window in its rest position and the build up of ice around the wiper blade is often greater than elsewhere on the window. It is desirable to free the wiper blade no later than when the remainder of the window is de-iced, and preferably earlier so that the wiper blade can be used to sweep partly melted ice from the window. This can be achieved by locating a relatively high heat output mesh-like heating element at the wiper rest position. The remainder of the window may be provided with any desired form of heating means.

Preferably, such panel includes a plurality of mesh-wise deposited heating elements. There may for example be three to five such elements which are spaced apart by 10 mm or less in embodiments constructed as a vehicle rear window. Under certain circumstances, the adoption of this feature can have a beneficial effect on the heat output distribution across the panel. The disadvantage of heat output disruption when a single heating element of the straight-line type is broken has already been adverted to, as has the advantage of the present invention in reducing the effects attendant on the breaking of a single mesh line. The use of a plurality of mesh-like heating elements is of advantage where there is a much larger rift in the deposited material. If a large rift runs across the direction of current flow within a single mesh-like heating element, then the heat output to either side of the rift will be reduced. When a plurality of mesh-like heating elements is used, the current flow pattern in any undamaged element will of course be unaffected.

Reference has been made to the practical necessity of using a silver-containing conductive enamel in heatable rear windows for vehicles and to the fact that silver is expensive. In fact, by the adoption of the present invention, it is possible to deposit greater quantities of material without adversely affecting the visual appearance of the panel, and this can lead to economies in manufacture. This may seem paradoxical, but because greater quantities of material can be deposited, any practical resistance requirement can be met by using a conductor which has a higher resistivity than silver and which is less expensive than silver, so that the practical necessity of using silver is no more. Accordingly, it is preferred that the conductive enamel of said mesh-wise deposited heating means contains a base metal or a mixture of base metals as sole conductive component. The expression "base metal" is used herein to distinguish between metals to which that expression is applied and the noble metals. Noble metals are silver, gold and platinum. To provide a good compromise between ease of application to the panel, conductivity, and aging properties, the or at least one said base metal is preferably selected from aluminium, nickel and copper.

Reference has been made to the use of panels according to the invention as heatable rear windows for vehicles and to a usual practical requirement that the heating element or elements should have a total electrical conductivity of about 1 reciprocal ohm. In fact when a conductive material is applied in a commercially acceptable way in mass production, the reproducibility of conductance as between one panel and the next is often not as good as may be desired.

When a mesh-like structure is used, it is found that such reproducibility can be improved by breaking as many mesh lines as is necessary to reduce the conductivity of the heater to a desired value. This may be done whenever the resistance value of the heater is below the desired value. In practice the reproducibility may be improved by applying a nominal excess of conductive material and then providing a discontinuity in the mesh.

Accordingly, in some embodiments of the invention the panel is characterised in that at least one mesh line of the mesh-wise deposited heating means is interrupted by a discontinuity.

Panels according to the invention intended for use as vehicle windows are often trapezoidal in shape, the bus strips converging towards the top edge of the window so that the distance between them is less in the top edge region. Other things being equal this implies that upper heating element portions will have a greater conductivity and thus a higher heat output than lower heating element portions. Accordingly, it may be desirable to modify the heat output distribution over the area of the panel. In particular in the case of a vehicle rear window, upper portions of the window are heated not only by Joule effect, but also by convection of air heated by lower regions of the window, so that it is often desirable for higher portions of the heater to have a lower heat output. This implied reduction in the conductivity of mesh-like heating means over the upper part of the window can also be achieved by breaking as many mesh lines as necessary.

Accordingly, in some embodiments of the invention in which said bus strips converge towards one edge of the panel so that the distance between them is reduced in that edge region, it is preferred that at least one mesh line of said mesh-wise deposited heating means is interrupted in such region.

Another way of augmenting constancy of electrical resistance as between successively produced panels which is adopted in some preferred embodiments of the invention is to make use of the feature that said heating means includes a base metal electrolytically deposited onto said mesh-like deposited material. Whether any given manufacturer adopts this feature, which requires less conductive material, will depend among other things on the cost of the additional electroplating step in relation to the value of the enamel saved, and this may of course vary from time to time and indeed from factory to factory. Of course such an electroplated heating mesh may be provided with one or more discontinuities.

When any panel according to the invention has its heater electroplated as aforesaid, it is possible to obtain further advantages.

It will be appreciated that the spaced bus strips of the panel should have as low a resistance as is consistent with a commercially viable product. This is especially so as regards those portions of a bus strip which lie within a few (say 5) centimeters of a current input terminal, since those portions are especially apt to become overheated. It will also be appreciated that for practical reasons, the whole panel is dipped in electrolyte so that the bus strips and heating elements are electroplated at the same time. As has been explained, in the manufacture of heatable vehicle windows it is generally desirable for the heater to have a resistance of about 1 ohm, and thus the panel must be withdrawn from the electrolyte when this resistance value has been achieved, no matter how much material has been deposited on the bus strips. A way has now been found of forming the bus strips which enables the electrolytic deposition of metal thereon to be increased in rate especially close to the current input terminals. Accordingly, it is preferred that each said bus strip comprises electrically conductive material deposited on the substrate over the area to be occupied by that bus strip in a pattern such that the conductive material extends continuously along the length of the area of the strip leaving bare interstices distributed along that area, and an electrolytically deposited base metal overcoating. By adopting this feature, bus strips can be formed which have an augmented conductance close to their terminals, thus providing favourable conductance characteristics for the bus strips when the panel is in use, with the result that excessive heating of the bus strips in their terminal regions is reduced or avoided.

The electrolytically deposited base metal is preferably copper and/or nickel.

When use is made of a pattern-wise deposited bus strip as aforesaid, useful modification of the heat output distribution can be achieved by ensuring that at least some of said mesh lines are directly connected to one or some only of a plurality of bus lines constituting such patterned deposit as is preferred in some embodiments of the invention. This can readily be achieved by ensuring that one or some of the mesh lines of the or an element of said heating means and/or one or some of said bus lines exhibits at least one discontinuity allowing direct electrical connection between the or at least one said heating element and one or some only of said bus lines. As an optional additional feature of such embodiments, the or at least one of said bus lines is interrupted to one side of its points of connection to said mesh lines and the or each interrupted bus line is connected to at least one other bus line by a transverse bus line located on the opposite side of such interruption to a terminal point adapted to receive a current supply wire connection.

BRIEF DESCRIPTION OF THE DRAWING

Preferred embodiments of the present invention will now be described by way of example with reference to the accompanying diagrammatic drawings in which:

FIGS. 3 and 4 are elevations of further embodiments of heatable panel according to the invention; and FIG. 5 is a detail view of yet a further embodiment.

DESCRIPTION OF THE PREFERRED EMBODIMENTS

Figure 1:
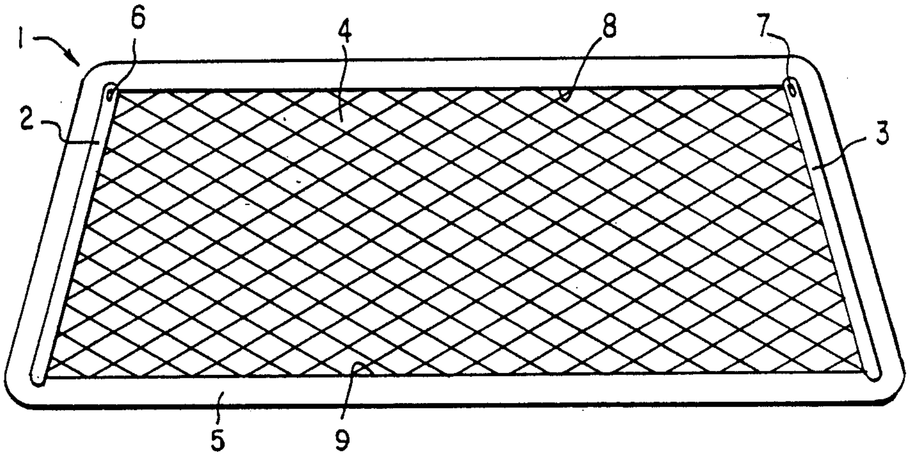
FIG. 1 is an elevation of an embodiment of heatable panel according to the invention.

FIG. 1 illustrates an electrically heatable light-transmitting panel 1 comprising spaced electrically conductive bus strips 2, 3 interconnected by electrically conductive heating means 4. The bus strips and heating means are deposited on a substrate 5 of glazing material. In the embodiment illustrated, the substrate 5 is a curved, trapezoidal sheet of tempered glass for use as a vehicle rear window, though it could be used for other purposes. It will be appreciated that the choice of shape and curvature of the substrate 5 are matters for the vehicle body designer and are substantially irrelevant for the purposes of the present invention. The upper ends of the bus strips 2, 3 have a respective input terminal 6, 7.

In accordance with the invention, the heating means 4, comprises an electrically conductive enamel deposited mesh-wise on the substrate 5.

In this way, accidental breakage of any single heating element mesh line will have only a marginal effect on the heat output distribution of the panel, since current will still be able to flow along the broken element around the break, and the current through the unbroken elements will be substantially unaffected.

It will be noted that in the trapezoidal arrangement illustrated, the upper edge 8 of the heating element 4 is shorter than the lower edge 9. Other things being equal, this implies that the conductivity and thus the heat output from the upper portion of the heating element 4 will be greater. It will be borne in mind that if the panel 1 is installed with the shorter edge 8 of the heating element 4 uppermost, the panel area covered by that upper portion of the heating element will also be heated by convection of air warmed by the lower portions. In order to compensate for these effects, so as to achieve a more nearly uniform temperature distribution across the panel while it is in use, a desired number of mesh lines of the upper portion of the heating means 4 can be interrupted, for example by being broken close to one or both of the bus strips 2, 3.

In a variant of the embodiment illustrated, the panel area covered in the drawing by the heating means 4, is covered by three mesh-wise deposited conductive heating elements. In other variants of the embodiment illustrated, that panel area is heated by two, four, five or six mesh-wise deposited conductive heating elements.

The mesh pattern of the heating element or elements may for example be rectangular, for example square, diamond or lozenge, or hexagonal.

Figure 2:
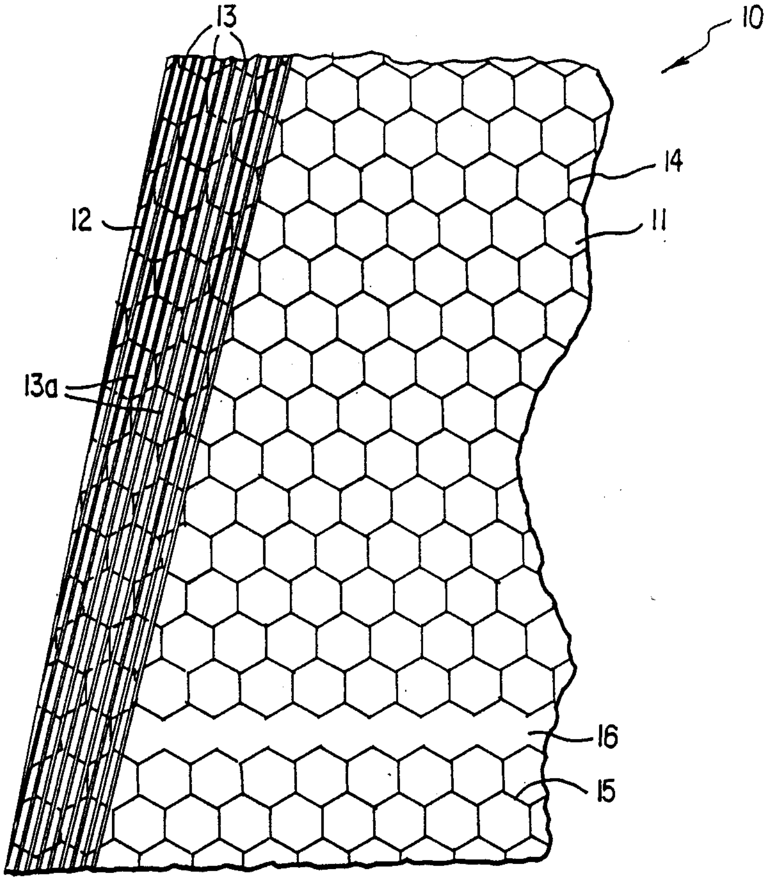
FIG. 2 is an enlarged elevation of an embodiment of heatable panel according to the invention.

FIG. 2 shows a detail view of an embodiment of heatable panel according to the invention in which the panel 10 has a substrate 11 of glazing material onto whose side margins bus strips such as 12 are deposited. As illustrated, the bus strips 12 comprise a plurality of generally parallel lines 13 of conductive enamel running lengthwise of the bus strip area. These lines are interconnected at least at the top of the panel (not shown) where a conductor terminal is provided. Because of the pattern of these lines 13, a saving in enamel is achieved when the bus strip 12 illustrated is compared with a bus strip of the same width formed by a uniform deposit of enamel. In fact the bus strip illustrated tapers in width in the downward direction, that is in the direction away from the current input terminal at its upper end. This gives a further saving in conductive enamel.

Also shown in FIG. 2 are portions of two heating elements 14, 15 which extend across the panel between the bus strips. It will be noted that the two heating elements 14, 15 are deposited in a hexagonal mesh pattern and that the gap 16 between them is simply formed by eliminating one row of vertical-running mesh lines.

It will be noted that the heating elements 14, 15 are connected across the full width of the bus strip 12. This is achieved by depositing those heating elements right up to the edge of the substrate 11. If it is desired to modify the heat output pattern of one or more of these heating elements, a desired number of mesh lines may be interrupted as described with reference to FIG. 1. In fact, in the embodiment of FIG. 2, such interruption may be made in an interstice 13*a* between bus lines 13 so that part or all of a heating element is directly connected to one or some only of those bus lines.

After deposit of the conductive enamel to form the mesh-like heating elements 14, 15 and the lines 13 of the bus strip 12, the panel is immersed in an electrolyte for electrodeposition of a base metal onto the enamel. Copper sulphate solution is a suitable electrolyte for depositing copper. Electrodeposition continues for as long as desired, to bring the overall conductance of the heating elements to a required value. At the same time of course, metal is deposited onto the lines 13 of the bus strips 12. It is found that by using a patterned bus strip of this sort that the rate of electrodeposition is particularly high close to the terminal. This results in a bus strip having favourable conductance characteristics in that excessive overheating of the bus strip close to the terminal is reduced or avoided.

FIG. 3 illustrates a further embodiment of heating panel suitable for use as a vehicle rear window. In FIG. 3, a substrate 17, for example of tempered glass has deposited on its left hand side margin a bus strip 18. Two bus strips 19, 20 are deposited in tandem along the right hand side margin of the substrate 17. In the upper part of the panel, bus strips 18 and 19 are interconnected by a plurality of heating elements 21 to 30. These elements 21 to 30 are shown in the drawing as being straight-line elements of the conventional type. It will be appreciated that one or more mesh-wise deposited heating elements may be substituted for these heating elements if desired.

Across the lower portion of the panel, a mesh-wise deposited heating element 31 extends between bus strips 18 and 20, in accordance with this invention. In some preferred embodiments of the panel illustrated in FIG. 3, the mesh heating element 31 is arranged to have a higher heat output per unit area of panel heated thereby than the upper heating elements 21 to 30, in order to compensate for convection heating effects to which the upper part of the panel is subjected and so as to render the temperature of the panel more nearly uniform across its height. In other preferred variants of the illustrated embodiment, the conductivity of the mesh element 31 is still further increased so that the temperature of the lower portion of the panel will be greater than that of the upper portion. This is especially advantageous when the panel is to be equipped with a wiper whose blade has a rest position within the area of the mesh heating element 31.

By the provision of two bus strips 19, 20 at one side of the panel, the heating element group 21 to 30 and the element 31 can be independently energised if desired. Of course these two bus strips may be joined if desired to form a single bus strip.

In FIG. 4, a substrate 32 has deposited thereon three mesh-like heating elements 33, 34, 35 extending between bus strips respectively 36, 37, 38 at one side of the substrate and a common bus strip 39 at the other side of the substrate. As illustrated, the central heating mesh element 34 is necked down over its central portion 40. This has the effect of concentrating current supplied to the central heating element over its central portion 40 so that that part of the substrate is heated more quickly. This provides rapid de-icing or demisting of that central portion. As shown in the drawing, the upper and lower heating elements 33, 35 have portions 41, 42 occupying those areas of the substrate 32 bordering the necked down central portion 40 of the central element 34, so that the upper and lower heating elements are wider in their central portions than they are at the sides of the panel. This will reduce current density in those heating elements. In order to avoid this if desired, one or both of the portions 41 and 42 can be isolated if desired by cutting the mesh along the dotted lines so that one or two generally trapezoidal areas of the substrate 32 are left coated by unenergisable mesh-wise deposited heating element material. Of course it may be desirable to have a reduced current density in the upper heating element to compensate for convection heating effects as has been referred to.

Another way of achieving such reduced current density in the upper heating element 33 is to interrupt the heating mesh as indicated at 43, so that it is discontinuous.

As examples of suitable materials which may be used to form the mesh-like heating elements of a panel according to the invention are those available from Engelhard of Valley Road, Cinderford, Gloucestershire under their references T-2497 (aluminium containing enamel) and T-3731 (nickel containing enamel). These enamels are approximately 40% of the cost of a silver containing enamel.

In FIG. 5, a panel comprises a substrate 44 of glazing material on a margin of which is deposited a bus strip 45. The bus strip 45 comprises a terminal portion 46 adapted for connection of current supply wire, and bus lines 47, 48 extending along the panel margin. Two mesh-wise deposited heating elements 49, 50 are deposited on the substrate 44. The mesh lines 51 of one of those heating elements 49 are discontinuous at 54 in an interstice 55 between the lines 47, 48 of the bus strip 45, so that those mesh lines 51 are directly connected to some only 47 of the bus lines, while the mesh lines of the other element 50 are connected to all the bus lines 47, 48. To one side of the points of connection of the mesh lines 51 to the bus lines 47, between the heating element 49 and the bus terminal portion 46, those lines 47 are interrupted by a discontinuity 52. On the opposite side of the discontinuity 52 to the bus terminal portion 46, the interrupted bus lines 47 are connected to the other bus lines 48 by one or more transverse bus lines 53. The result of this arrangement is that heating current to the heating element 49 can only flow through the uninterrupted bus lines 48, the transverse bus lines 53 and then the interrupted bus lines 47. This has the effect of reducing the heat output from that heating element 49.

We claim:

1. An electrically heatable transparent panel constituting a vehicle window comprising spaced electrically conductive bus strips interconnected by electrically conductive heating means deposited on a substrate of glazing material, characterised in that said heating means (4) comprises electrically conductive enamel deposited meshwise on said substrate the interstices of such conductive mesh having a maximum dimension of 6 mm or less, substantially no individual line of such conductive mesh (4) being greater than 0.3 mm in width.

2. A panel according to claim 1, characterised in that substantially all the interstices of such conductive mesh (4) have a smallest dimension of at least 1.5 mm.

3. A panel according to claim 1, characterised in that substantially all said interstices have dimensions of between 2 mm and 6 mm.

4. A panel according to claim 1, characterised in that such conductive mesh (4) is so deposited as to cover no more than 20% of the area of the panel enclosed by the boundary of such mesh.

5. A panel according to claim 1, characterised in that the conductive mesh (4) is deposited in a hexagonal, rectangular or diamond mesh pattern.

6. A panel according to claim 1, characterised in that said mesh-wise deposits constitute heating elements (14, 15).

7. A panel according to claim 1, characterised in that the conductive enamel of said mesh-wise deposited heating means (4) contains a base metal or a mixture of base metals as sole conductive component.

8. A panel according to claim 7, characterised in that the or at least one said base metal is selected from: aluminium, nickel and copper.

9. A panel according to claim 1, characterised in that at least one mesh line of the mesh-wise deposited heating means (33) is interrupted by a discontinuity (43).

10. A panel according to claim 9, characterised in that said bus strips (36, 39) converge towards one edge of the panel so that the distance between them is reduced in that edge region and in that at least one mesh line of the mesh-wise deposited heating means (33) is interrupted (43) in such region.

11. A panel according to claim 1, characterised in that said heating means (4) includes a base metal electrolytically deposited onto said mesh-wise deposited material.

12. A panel according to claim 1, characterised in that each said bus strip (12, 45) comprises electrically conductive material deposited on the substrate over the area to be occupied by that bus strip in a pattern (13 or 47, 48) such that the conductive material extends continuously along the length of the area of the strip in the form of bus lines leaving bare interstices (13*a*, 55) distributed along that area between said bus lines, and an electrolytically deposited base metal overcoating deposited only on said conductive material.

13. A panel according to claim 11 or 12, characterised in that said electrolytically deposited base metal is copper and/or nickel.

14. A panel according to claim 12, characterised in that at least some of the mesh lines (51) are directly connected to less than all of said bus lines of each said bus strip.

15. A panel according to claim 14, characterized in that said conductive mesh lines constitute at least one heating element, constituted by such conductive mesh, which is directly electrically connected to less than all of said bus lines of at least one said bus strip.

16. A panel according to claim 15, characterized in that said at least one bus strip comprises a conductive terminal portion located adjacent one end of said bus lines of the associated bus strip for connection to a current supply wire, at least one of said bus lines of said at least one bus strip is interrupted at a location between the region where said at least one bus strip is connected to said heating element and said terminal portion, and said at least one bus strip further comprises a transverse bus line connecting said at least one bus line to one said bus line which is not interrupted at a location at the opposite side of said region from said terminal portion.

17. A panel according to claim 1 wherein said conductive mesh is formed to present a plurality of conductive paths extending between said bus strips and conductively interconnected transversely of said paths at a plurality of locations between said bus strips.

* * * * *